F. C. RANDALL.
FRUIT WASHER.
APPLICATION FILED SEPT. 14, 1917.
1,245,768.
Patented Nov. 6, 1917.
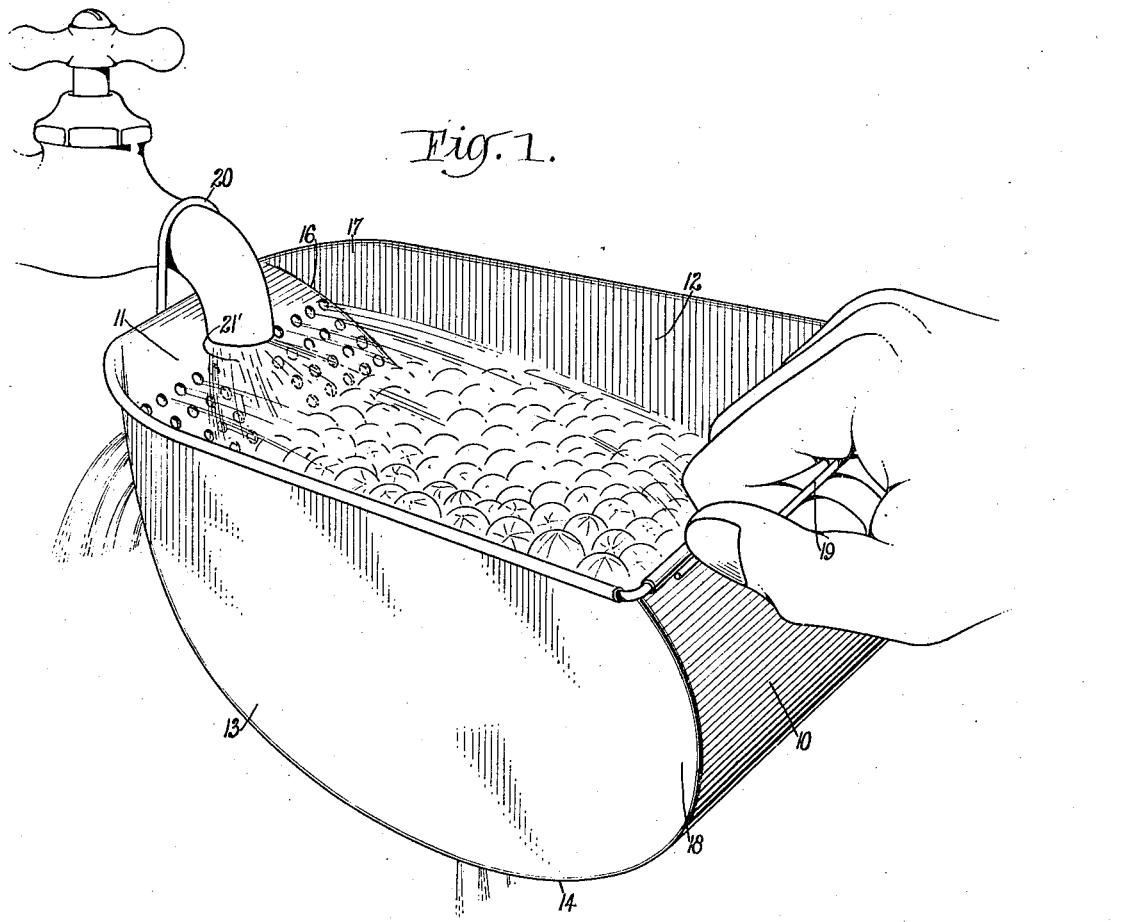
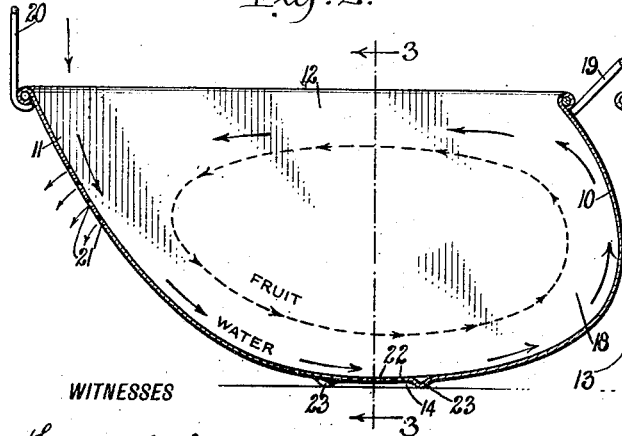
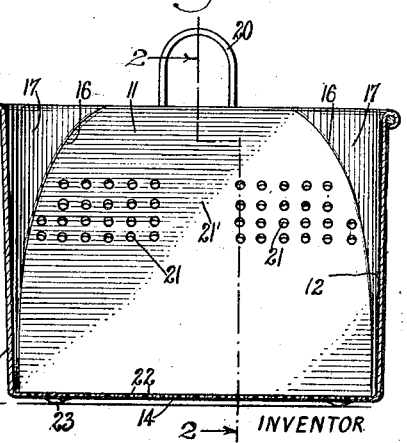
WITNESSES
Frederick Diehl.
Geo. L. Beeler
INVENTOR
F. C. Randall.
BY
ATTORNEYS

UNITED STATES PATENT OFFICE.

FRANK CALVIN RANDALL, OF BENTON HARBOR, MICHIGAN.

FRUIT-WASHER.

1,245,768.   Specification of Letters Patent.   Patented Nov. 6, 1917.

Application filed September 14, 1917. Serial No. 191,375.

*To all whom it may concern:*

Be it known that I, FRANK C. RANDALL, a citizen of the United States, and a resident of Benton Harbor, in the county of Berrien and State of Michigan, have invented a new and Improved Fruit-Washer, of which the following is a full, clear, and exact description.

This invention relates to fruit and vegetable washers of a general character similar to those covered by Letters Patent of the United States issued to me on the 23rd day of November 1915, No. 1,161,727; and my copending application Serial No. 181,497, allowed July 28, 1917.

Among the objects of this present invention is to simplify and cheapen the construction of the device as a household commodity.

Another object of the invention is to provide a washer of the character indicated which is of the simplest possible construction with respect to its adaptability of manipulation and whereby the contents may be more thoroughly cleansed in a brief time and with less injury to the same than has heretofore been possible.

A still further object of the invention is to provide a fruit or vegetable washer adapted particularly for use in direct connection with an ordinary sink faucet, while at the same time it is adapted for use in connection with any ordinary hose or faucet connection.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a perspective view indicating a preferred embodiment of the invention in operative position.

Fig. 2 is a vertical longitudinal section on the line 2—2 of Fig. 3; and

Fig. 3 is a vertical transverse section on the line 3—3 of Fig. 2.

Referring now more particularly to the drawings I show my new form of washer in the form of an open topped dish or pan-like receptacle having front and rear end portions 10 and 11 respectively, right and left side portions 12 and 13 and a bottom 14. The receptacle, subject to various kinds of material that may be used in its manufacture, may be stamped, molded, pressed or otherwise formed either of a single piece of material or of several pieces of sheet material suitably united along their meeting edges. I wish, however, at this time to call attention more particularly to the shape of the receptacle or relative proportions of the several component parts above indicated. The rear wall or rear end portion of the receptacle is approximately flat, but is inclined downwardly and toward the front at an angle of approximately thirty degrees with respect to the vertical, where it merges through a gradual rounded concave form into the rounded bottom 14, the latter merging into the rounded front portion 10 of the receptacle, the upper end of which overlaps the bottom or projects rearwardly toward the rear end of the receptacle. See Fig. 2. This description of the form of the bottom and end portions has reference to the longitudinal section whereas in the transverse section it will be noted that the transverse elements of the bottom and end portions are or may be all substantially straight and parallel with one another. This fact not only simplifies the manufacture of the device, but facilitates the flow and cleansing action of the water calculated to be admitted upon the sloping or inclined flat rear wall. The strip of material forming the rear, bottom and front portions is flared somewhat throughout its length, being wider at the front end than at the rear end, while the extreme rear end or point of the rear wall is more particularly restricted in width, as indicated along the line 16.

The side walls 12 and 13 are both of the same shape and size and in conformity with the shape of the bottom and end walls already set forth, each of the side walls is tapered at its rear end at 17 where it merges into the restricted rear end or point of the wall 11, while the front portion 18 is fuller and rounded where it meets the undercut portion or convacity of the front portion of the receptacle. From what has been stated above it will be understood that the open top of the receptacle is wider than the bottom thereof and likewise is flared toward the front. It will be noted also that while the receptacle is in its normal horizontal position the top thereof lies in a horizontal plane. All of these features lend facility to the nesting of the devices for shipping and storage purposes, but moreover have particular utility with respect to the cleansing operation of the device as will more fully appear as this description progresses.

Any suitable bail or handle 19 may be connected to the upper portion of the front end 10, and an ear or loop 20 is fixed to the rear end 11, said ear being preferably rigid and projecting vertically.

The rear end or wall is provided with a field of perforations 21 extending entirely across the same between the lines 16 of connection of said end and the points 17 of the side walls, except that a smooth imperforate field is recognized at 21' just beneath the ear 20. This field of perforations 21 is located well up and rearwardly toward the upper edge of the rear wall. A second field of perforations 22 is formed through the central part of the bottom wall 14, said field extending entirely across the bottom transversely, but having only a short extent longitudinally of the receptacle. Lugs or feet 23 may be formed on the bottom of the receptacle adjacent to the field of perforations 22 and are adapted to serve two purposes, namely, to hold the receptacle in upright position and to facilitate the drainage of the contents after the flushing operation is completed.

The operation of the device may be briefly set forth as follows: With a quantity of berries, vegetables, fruits or the like in the receptacle and approximately half filling the same, the operator grasping the handle 19 may hang the rear end upon a faucet as indicated in Fig. 1, the connection with the faucet being easily made by dropping the front end of the receptacle slightly so as to pass the ear 20 over the faucet and then slipping the ear over the faucet where the rear end will be reliably held when the receptacle is lifted into horizontal position, at which time the upper edge of the rear end will bear against the end of the faucet and prevent accidental slipping of the receptacle from the position indicated. Then the water is turned on gradually until it reaches slightly higher than the content of berries, fruit, etc., and when sufficient water is turned on to start the entire content, water and all, turning continuously over and over, in an actual loop the loop manner, each article as it reaches the rear of the receptacle is caught by the down shoot of the water and carried with it under and around an imaginary transverse axis or center, and this movement of the entire content is continuous so long as the water pressure is kept turned on. The contained articles following the path of the water, rotate upon their own axes, but also revolve around said imaginary center bumping from one to another, and from the rear to the front and back again to the rear, where they are again caught by the rush of water and the glancing blow of the same and again shot downward over the same course as before. The consequent friction of the rush of water and the agitation caused thereby together with the consequent friction of one article upon another in constant rotation and revolution thoroughly cleanses the surfaces of each article, the heavier particles of sand, dirt, etc., escaping at the lower perforations 22 while the lighter particles, together with the excess of water find quick exit through the field of upper rear perforations 21. The forward and upward flaring of the receptacle facilitates this free flowing and cleansing action of the water and fruit and furthermore insures that while the water may be admitted with maximum force from the faucet there is no necessity for the contents of the receptacle to be pushed or thrown over the top thereof, the movement of the contents of the receptacle following the course indicated for the water. After the flushing operation is completed the receptacle with its contents is lowered at its front end for detachment from the faucet and may then be stood on the feet 23 in erect position for drainage.

I claim:

1. The herein described fruit washer comprising an open topped receptacle having a narrow rear end and a wider front end, the bottom of the receptacle being inclined downwardly and forwardly at the rear end and rounded or concave with respect to the longitudinal dimension from the rear to the front and thence bent upwardly and rearwardly at the front end, and side walls each having a narrow pointed rear end and a rounded larger front end, the side walls being approximately flat, there being provided a field of perforations at the upper portion of the rear wall and drainage means at the bottom of the receptacle.

2. The herein described fruit washer comprising a receptacle having bottom, end and side walls, the top of the receptacle being open and lying normally in a horizontal plane, one end of the wall being inclined downwardly and toward the other end, while the other end is concave and having its upper portion projecting over toward the inclined end, a hanger device connected to the inclined end, said end having a field of perforations extending across the same except for a smooth imperforate portion directly beneath the hanger, and drainage devices provided in the bottom substantially midway between the ends of the receptacle.

3. The herein described fruit washer comprising an open topped receptacle having bottom and end portions constituting a continuous strip of material, one end being flat but inclined downwardly and toward the other end where it merges into the rounded bottom and the other end being rounded and undercut with its top projecting toward the inclined end, the latter mentioned undercut end being wider than the inclined end, said receptacle also including side walls that are substantially flat but lying in a plane diverging from each other vertically as well as toward the rounded or undercut end, a hanger connected to the inclined rear end, and a handle connected to the undercut front end, there being provided a field of perforations across the rear end in the region of the hanger and a field of perforations across the bottom approximately midway between the ends, substantially as set forth.

FRANK CALVIN RANDALL.

Copies of this patent may be obtained for five cents each, by addressing the "Commissioner of Patents, Washington, D. C."